United States Patent [19]

Nam et al.

[11] Patent Number: 5,128,546

[45] Date of Patent: Jul. 7, 1992

[54] DIAMOND SCINTILLATION DETECTOR

[76] Inventors: Tom L. Nam, 114 6th Avenue, Bez Valley, Transvaal; Hendrik J. Van Rijn, 98 1st Avenue, Berario, Transvaal; Rex J. Keddy, 3 Bevan Road, Rivonia Transvaal; Paul J. Fallon, 303 Wellington Road, Lombardy East, Transvaal; Joanne F. Schlimmer neé Andrews, 33 8th Avenue, Orange Grove, Transvaal, all of South Africa

[21] Appl. No.: 458,188

[22] Filed: Dec. 28, 1989

[30] Foreign Application Priority Data

Dec. 28, 1988 [ZA] South Africa ............... 88/9676

[51] Int. Cl.$^5$ .................................. G01T 1/202
[52] U.S. Cl. ..................... 250/361 R; 252/301.4 F
[58] Field of Search ............... 250/361 R, 483.1; 252/301.4 R, 301.4 P

[56] References Cited

U.S. PATENT DOCUMENTS

| | | | |
|---|---|---|---|
| 2,188,115 | 1/1940 | Kallmann et al. | 250/390.11 |
| 3,939,094 | 2/1976 | Kauffman | 250/483.1 |
| 4,465,932 | 8/1984 | Burgemeister | 250/370.07 |
| 4,833,328 | 5/1989 | Prins et al. | 250/370.01 |

FOREIGN PATENT DOCUMENTS 68580  4/1986  Japan .................. 250/368

OTHER PUBLICATIONS

Nam et al, "Detection of Nuclear Radiation by Scintillation Counting Using Synthetic Diamond", Appl. Radiat. Isot., 40 (8), 1989 pp. 657–661.
Fallon et al., "Synthetic Diamonds Using as Pulse-counting Gamma-ray Detectors", Appl. Radiat. Isot., 41 (1), pp. 35–39, 1990.

Primary Examiner—Carolyn E. Fields
Attorney, Agent, or Firm—Scully, Scott, Murphy & Presser

[57] ABSTRACT

The invention provides a scintillation detector for nuclear radiation which comprises a synthetic diamond having a nitrogen impurity concentration of 150 ppm or less. The detector has solvent (or oxides thereof) impurity concentrations of 1000 ppm or less, where the solvents are any of the following: Ni, Cu, Mn, Al or Cr, or combinations thereof. The detector has Fe and Co impurity concentrations of less than 10 ppm. A practical version of the detector includes an optical fibre and a photomultiplier tube, the optical fibre collecting light emitted by the diamond and channelling it to the photomultiplier tube.

9 Claims, 5 Drawing Sheets

DIAMOND SCINTILLATION DETECTOR

BACKGROUND OF THE INVENTION

This invention relates to a scintillation detector for nuclear radiation.

When certain materials are subjected to nuclear radiation, atoms or molecules in the material are raised to a higher energy state. When the atoms or molecules revert to their ground state, light may be emitted. If light is emitted only during excitation, the phenomenon is called fluorescence, while if substantial light emission occurs after the incident radiation has ceased, the phenomenon is called phosphorescence (after-glow).

When nuclear radiation is incident on the material, ionization occurs, creating a large number of charged carriers. The number of electron-hole pairs created is proportional to the energy of the incident radiation. If suitable centres, known as luminescence centres, are present, the electron-hole pairs re-combine at the centres, giving off light. The intensity of the light emitted by the material is proportional to the energy of the incident radiation. The total number of light pulses produced gives an indication of the intensity of the incident radiation, and the distribution of the magnitude of the pulses is related to the incident particle energy. The detection of radiation by means of the above described phenomenon is known as scintillation counting.

The possibility of using natural diamond as a scintillation counter has been recognised for some time. However, most natural diamonds and also synthetic diamonds exhibit a long after-glow. In the case of synthetic diamond, an after-glow of up to several hours is possible. This results in poor time and energy resolution, and results from the presence of trapping centres in these diamonds. The trapping centres remove a certain fraction of the charged carriers of either sign produced by the incident radiation, resulting in energy degradation and poor time resolution. A subsequent vacating of these traps gives rise to varying degrees of phosphorescence. The presence of this phosphorescence "tail" makes such diamonds unsuitable for use as scintillation counters, since the count rates of these diamonds are not directly proportional to radiation intensity, and they may display relatively high background count rates even after cessation of the incident radiation.

SUMMARY OF THE INVENTION

According to the invention a scintillation detector for nuclear radiation is provided which comprises a synthetic diamond having a nitrogen impurity concentration of 150 ppm or less.

Preferably the diamond has solvent (or oxides thereof) impurity concentrations of 1000 ppm or less, where the solvents are any of the following: Ni, Cu, Mn, Al or Cr, or combinations thereof.

The scintillation detector preferably has Fe and Co impurity concentrations of less than 10 ppm.

The detector may include an optical element and a photomultiplier tube, the optical element collecting light emitted by the diamond and channelling it to the photomultiplier tube.

The optical element may be an optical fibre or "light pipe".

DESCRIPTION OF AN EMBODIMENT

Figure 1:
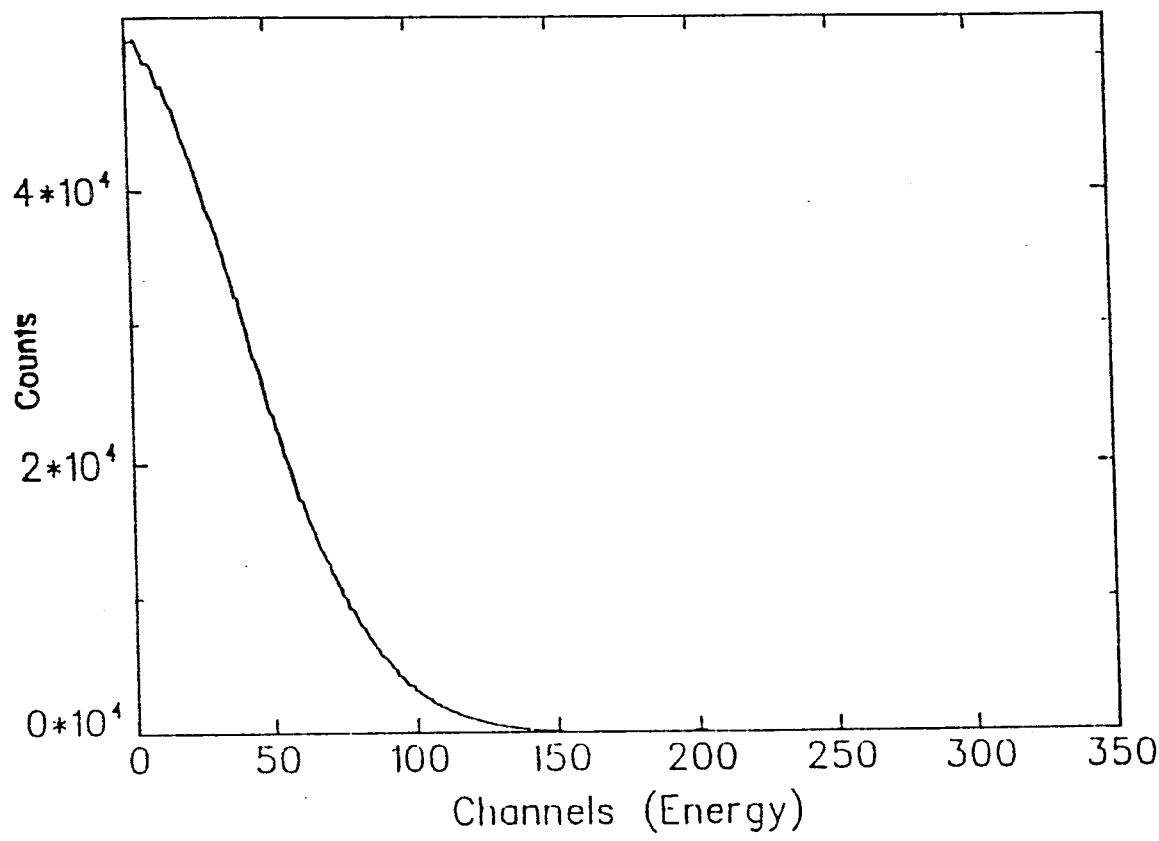
FIG. 1 is a graph of the energy response of an iron based synthetic diamond.
Figure 2:
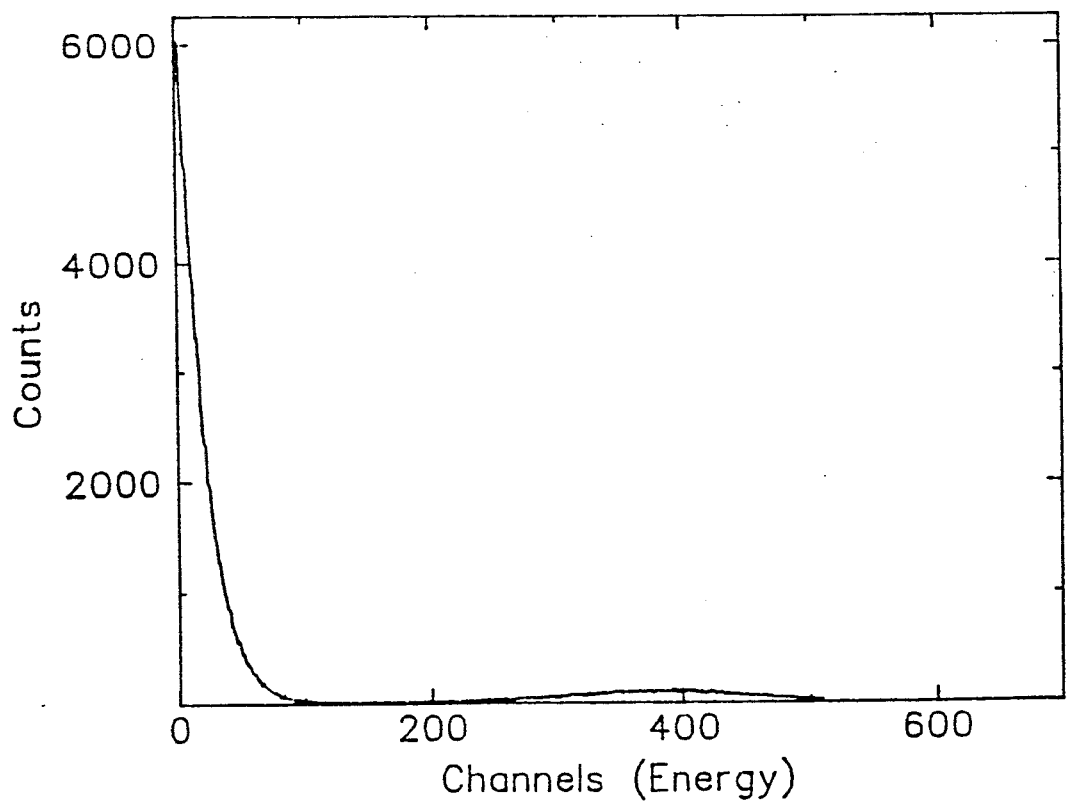
FIGS. 2 and 3 show the response of a relatively good polished natural diamond.
Figure 3:
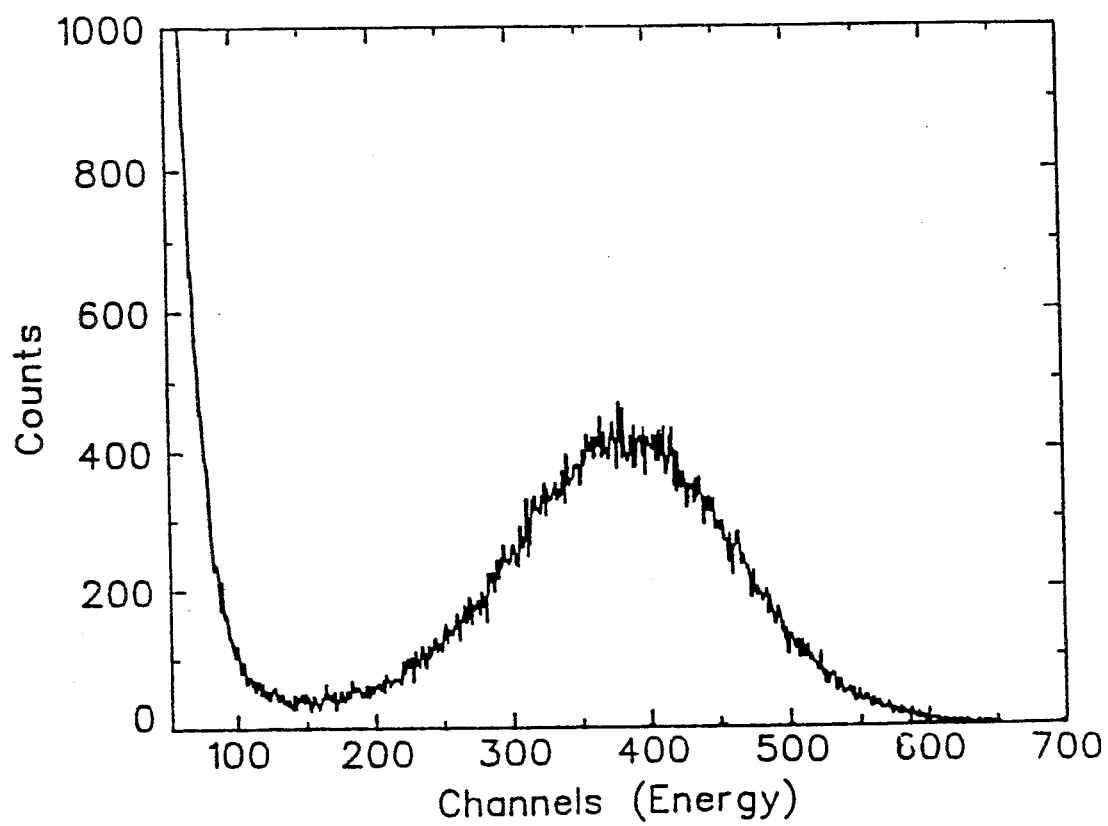
Figure 4:
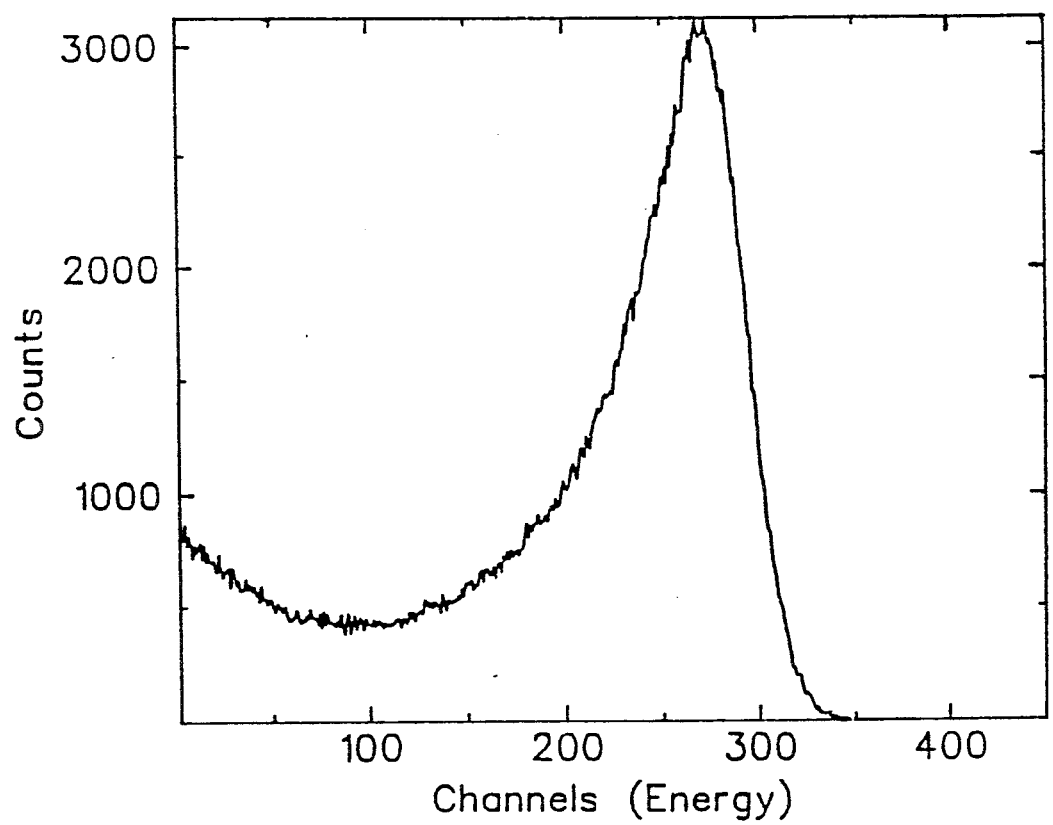
FIG. 4 shows the energy resolution of an un-polished diamond crystal according to the invention.
Figure 5:
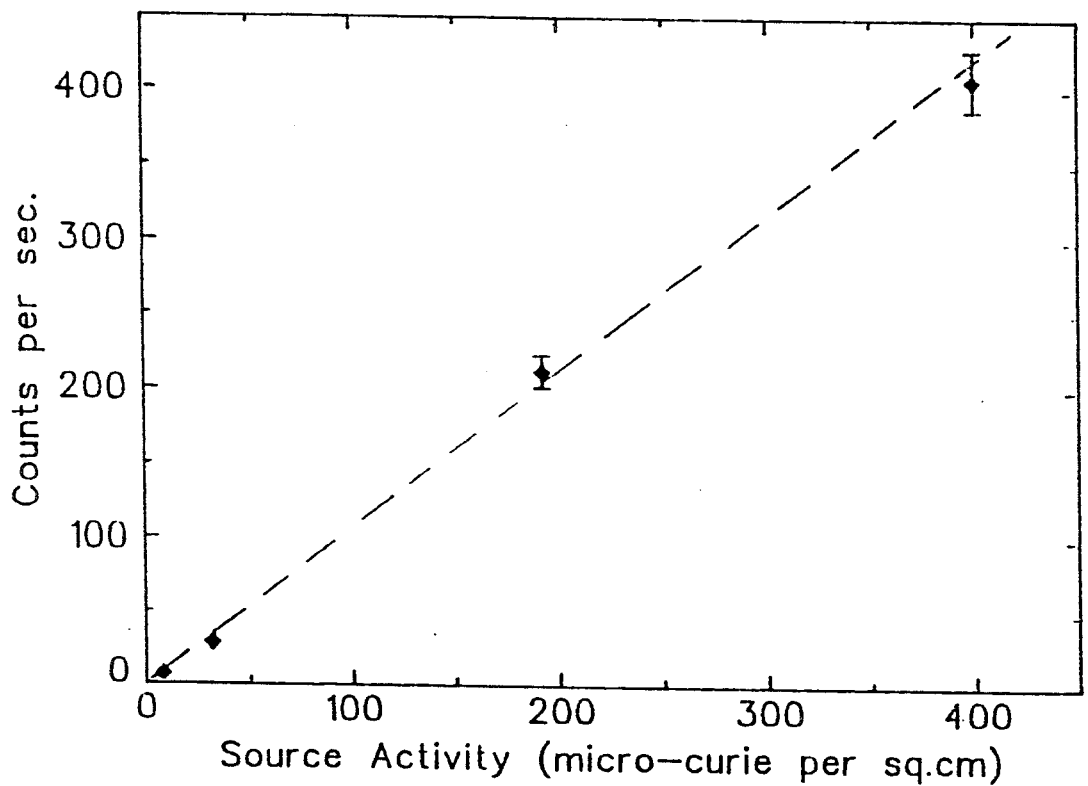
FIG. 5 is a graph illustrating the linearity of a diamond crystal according to the invention.
Figure 6:
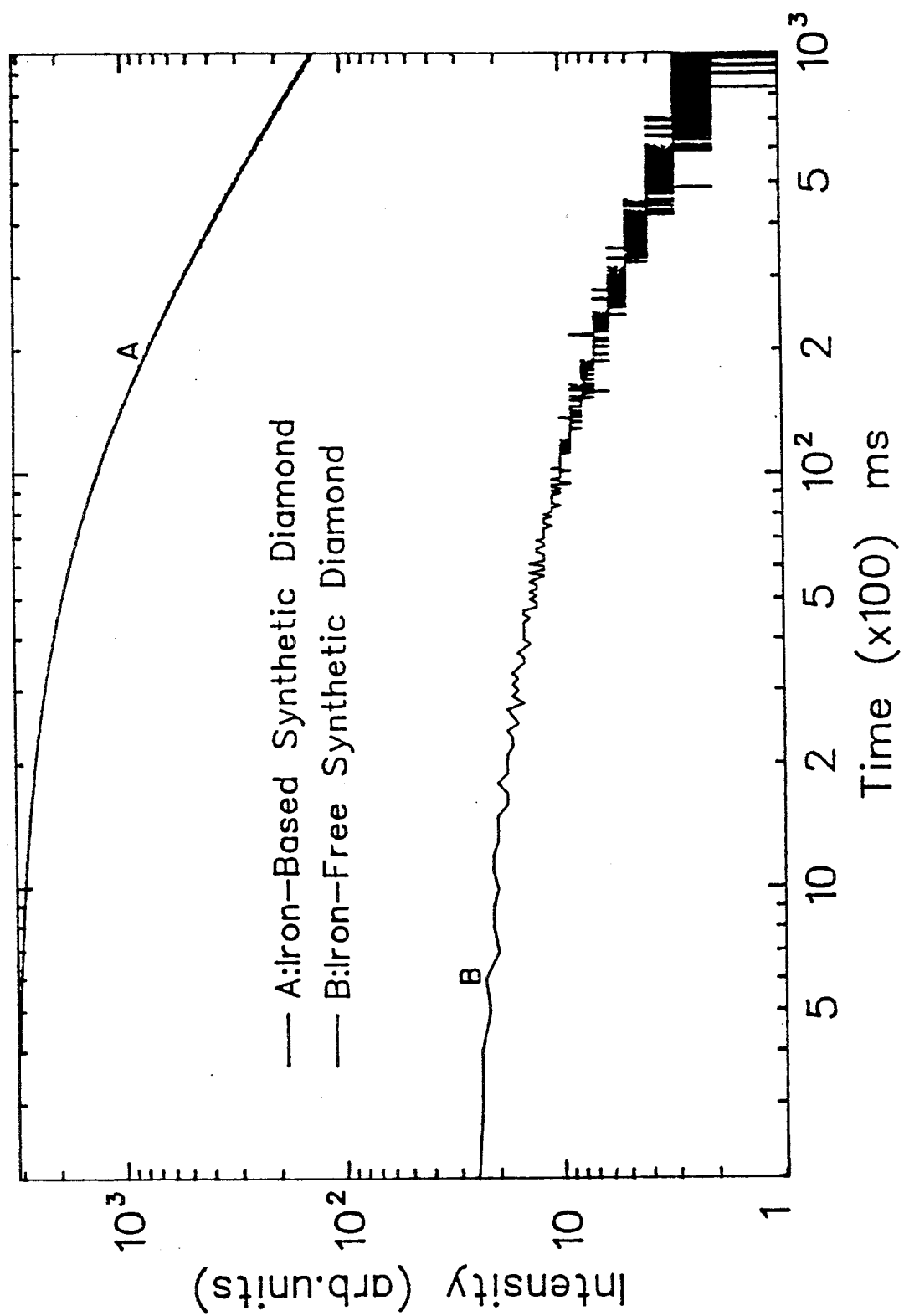
FIG. 6 is a graph comparing the phosphorescence decay of an iron-based synthetic diamond and a diamond crystal according to the invention.

A synthetic diamond scintillation detector according to the invention is grown from iron and cobalt free solvents, resulting in a diamond crystal with a nitrogen impurity concentration of 150 ppm or less, and a solvent impurity concentration of 1000 ppm or less. Furthermore, the Fe and Co impurity concentrations should each be less than 10 ppm. The solvents can be any of the following: Ni, Cu, Mn, Al or Cr, or combinations thereof. The energy resolution of an un-polished single diamond crystal having these characteristics is shown in FIG. 4, and exhibits a much better energy resolution than the prior art diamonds, the response of which is shown in FIG. 1 and FIGS. 2 and 3. The scintillation detector of the invention has a count rate which is proportional to the intensity of incident nuclear radiation (see FIG. 5), with a much lower level of phosphorescence or after-glow than prior art diamonds (see FIG. 6).

Figure 7:
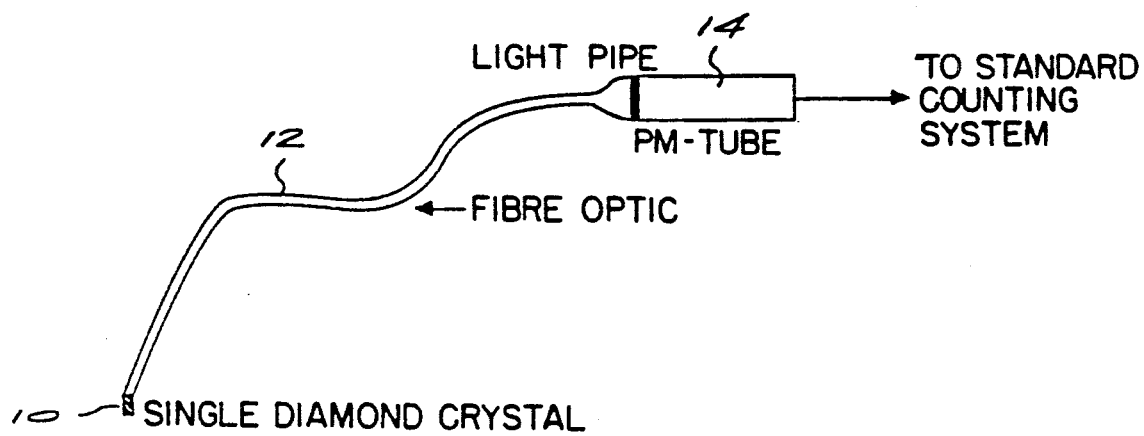
FIGS. 7 and 8 illustrate schematically two radiation detection arrangements according to the invention.
Figure 8:
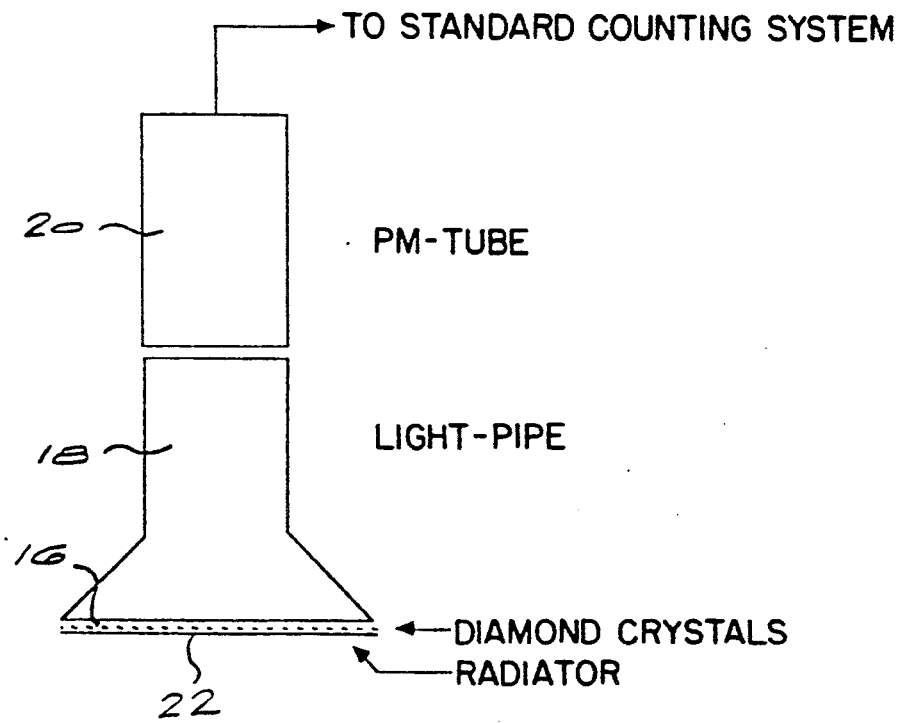

To produce a practical radiation detector, a single diamond crystal can be attached to the end of an optical fibre which is couple to a photomultiplier tube, or a bonded mass of crystals can be coupled via a multiple optical fibre "light pipe" to the photomultiplier tube, as shown in FIGS. 7 and 8.

The apparatus of FIG. 7 comprises a single diamond crystal 10 which is fixed to the end of a flexible optical fibre 12. Light from the diamond is fed by the fibre to a photomultiplier tube 14. The output of the photomultiplier tube is connected to a standard electronic pulse counting system (not illustrated).

In certain applications, where small size is important, a single crystal detector may be preferable, for example, in in vivo radiation dose rate measurement and in accelerator beam profile monitoring. The use of a bonded mass of crystals may be preferable, for example, in alpha radiation contamination monitors in health physics applications.

The apparatus illustrated schematically in FIG. 8 utilises a detector 16 comprising a bonded mass of diamond crystals configured as a flat disc. The bonded mass 16 is disposed at one end of a "light pipe" 18 which channels light pulses from the diamond crystals to a photomultiplier tube 20. Once again, the photomultiplier tube is connected to the conventional counting system.

The sensitivity of the detector of the invention to different forms of radiation may be modified by placing a layer of radiation absorbing material in front of the detector. For example, a layer 22 of polyethylene or boron may be used, to allow the monitoring of fast or thermal neutrons respectively. The layer absorbs the incident radiation and re-radiates particles which can be detected by the detector, the polyethylene layer acting as a proton radiator, and the boron layer acting as an alpha particle radiator.

We claim:

1. A scintillation detector for nuclear radiation which comprises a synthetic diamond having a nitrogen impurity concentration of 150 ppm or less and an iron impurity concentration of less than 10 ppm.

2. A scintillation detector according to claim 1 having solvent (or oxides thereof) impurity concentrations of 1000 ppm or less, where the solvents are any of the following: Ni, Cu, Mn, Al or Cr, or combinations thereof.

3. A scintillation detector according to claim 1 having a Co impurity concentration of less than 10 ppm.

4. A scintillation detector according to claim 1 which includes an optical element and a photomultiplier tube, the optical element collecting light emitted by the diamond and channelling it to the photomultiplier tube.

5. A scintillation detector according to claim 4 wherein the optical element comprises at least one optical fibre.

6. A scintillation detector according to claim 1 comprising a bonded mass of diamond crystals.

7. A scintillation detector according to claim 1 including a layer of selectively radiation-absorbent material.

8. A scintillation detector according to claim 7 wherein the layer comprises polyethylene.

9. A scintillation detector according to claim 7 wherein the layer comprises boron.

* * * * *